Figures 1, 4:
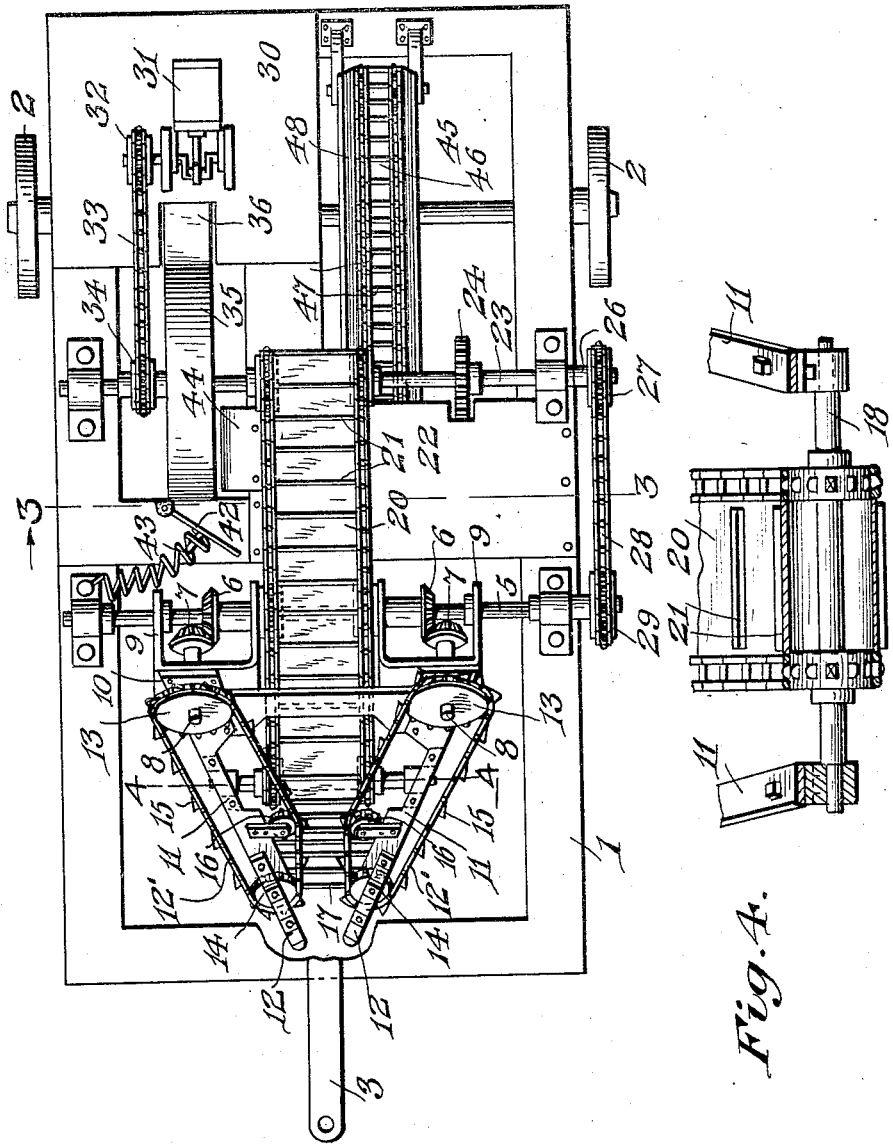

April 26, 1932. W. C. GOOKIN 1,855,549
BEET HARVESTER
Filed May 6, 1930 2 Sheets-Sheet 1

INVENTOR.
W. C. Gookin,
BY
Lacey & Lacey, ATTORNEYS

April 26, 1932.          W. C. GOOKIN          1,855,549
BEET HARVESTER
Filed May 6, 1930          2 Sheets-Sheet 2

Inventor
W. C. Gookin,
By Lacey & Lacey, Attorneys

Patented Apr. 26, 1932

1,855,549

UNITED STATES PATENT OFFICE

WILLIAM C. GOOKIN, OF CORYDON, IOWA

BEET HARVESTER

Application filed May 6, 1930. Serial No. 450,255.

This application is a continuation in part of Patent 1,815,503, the present invention relating more particularly to means for raising the lifted beets from the ground, transferring them to the topping platform and then delivering them to a receptacle at the rear of the machine. The invention is illustrated in the accompanying drawings and consists in certain novel features which will be hereinafter first fully described and then more particularly defined in the appended claim.

Figures 2, 3:
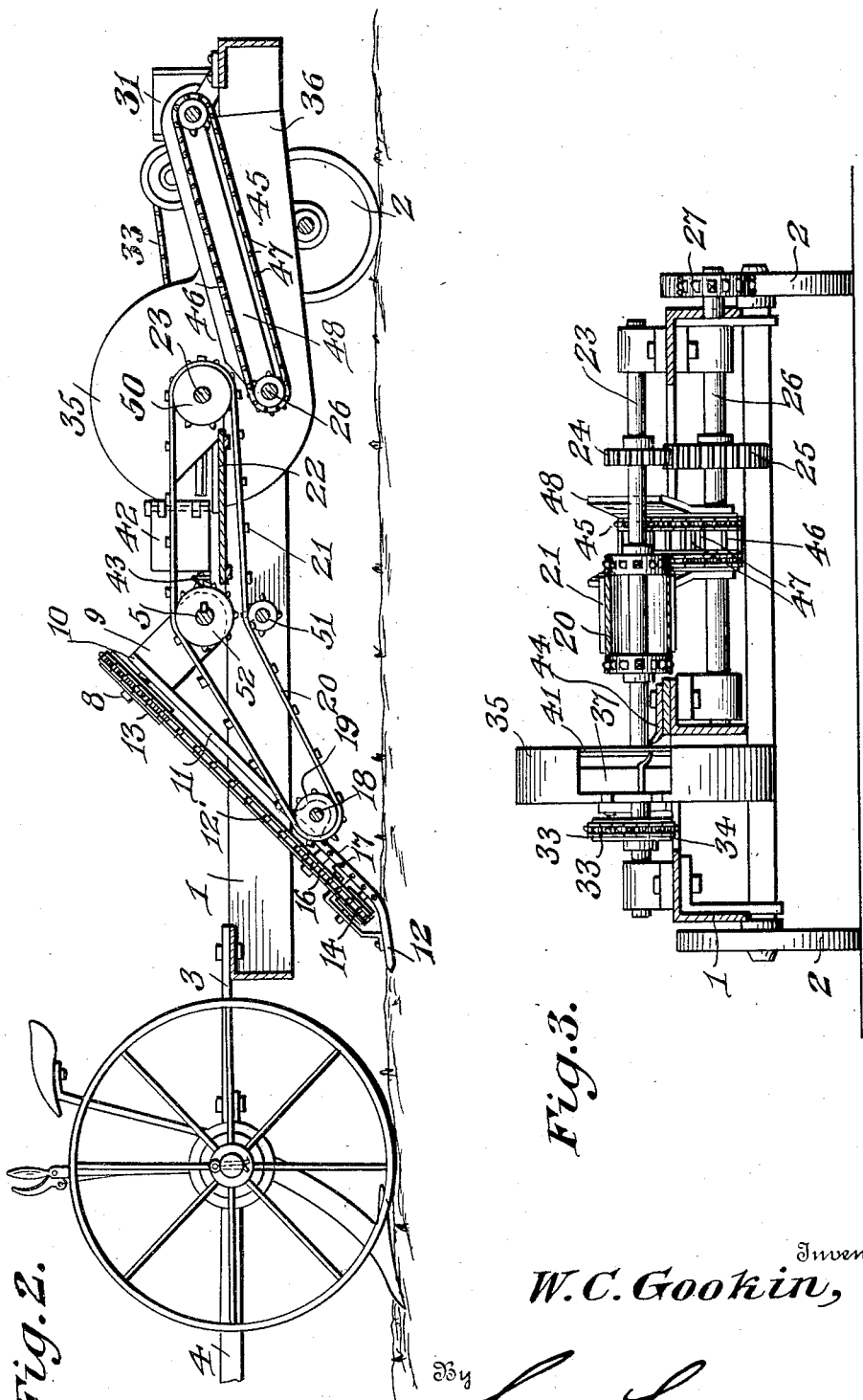

In the drawings:

Figure 1 is a plan view, partly broken away, of a machine embodying the invention, Fig. 2 is a longitudinal section, Fig. 3 is a transverse section on the line 3—3 of Fig. 1, and Fig. 4 is a detail transverse section on the line 4—4 of Fig. 1.

In carrying out the invention, there is provided a frame 1 preferably of rectangular formation and supported at or near its rear end upon ground wheels 2, a draft bar or coupling 3 being secured to the front end of the frame and adapted to be bolted or otherwise secured to a beet-lifting machine, indicated conventionally at 4, which may be of any approved type. At a point between the ends of the frame, a shaft 5 is mounted thereon in suitable bearings, and upon this shaft are secured beveled gears 6 meshing with beveled pinions 7 on the lower or rear ends of shafts 8 which are journaled in brackets 9 mounted upon the shaft 5, as shown. The brackets 9 are preferably U-shaped stirrups, to the shoulders of which are secured the upper ends of a yoke or frame 10 which has a rear member extending transversely of the machine between the shafts 8 and supporting the upper ends thereof, as shown most clearly in Fig. 1, and downwardly and forwardly converging side arms 11, also shown in Fig. 1. The lower forward ends of the arms 11 are formed into or have secured thereon shoes or runners 12 which are forwardly tapered and are adapted to run upon the ground at the sides of a row of lifted beets and past the beets so as to raise the same and present them to the conveyer chains 12'. The chains 12' are trained around driving sprockets 13 secured on the upper forward ends of the shafts 8 and around pinions 14 mounted upon the front faces of the side arms adjacent the runners, as clearly shown, and the chains are provided at intervals with lugs or projections 15 which are adapted to engage behind the beet bodies and push them upwardly and rearwardly. Referring particularly to Fig. 1, it will be noted that the inner runs of the chains are parallel at their forward portions and extend longitudinally of the machine, idlers 16 being provided to hold the chains in the desired paths. Extending between the side arms 11 below the forward portions of the inner runs of the chains are cross rods 17 which are spaced apart so that they form a screen or grid over which the beets and tops will be drawn and through which any sand or dirt which may be taken up with the beets may drop to the ground. Immediately in rear of the idlers 16, a cross shaft 18 is mounted in suitable bearings upon the side arms 11 and extends between said arms, this shaft carrying a drum or sprocket 19 about which a conveyer 20 is trained. The conveyer 20, as shown most clearly in Figs. 1 and 3, comprises a pair of parallel sprocket chains trained about the sprocket or drum 19 and a belt extending between the chains and provided with ribs 21 which are adapted to engage behind the beets deposited upon the apron or belt and thereby carry the same upwardly and rearwardly. The upper run of the conveyer is trained over and derives motion from sprockets 52 secured upon the shaft 5 between the gears 6 and then passes to idler sprockets 50 loose on the shaft 23, and it will now be understood that the beets drawn from the ground and left upon the ground by the beet lifter 4 will be successively taken up by the points or runners 12. Idlers 51 are mounted in any convenient manner below the shaft 5 to support the lower run of the conveyer.

At the rear of the shaft 5, a platform 22 is secured on the frame and at the rear of said platform is mounted the drive shaft 23 extending across the machine and equipped with a pinion 24 meshing with a gear 25 on a counter-shaft 26 disposed immediately below the driving shaft 23. On one end of the counter-shaft is a sprocket 27 and a chain 28 is trained about said sprocket and about a sprocket 29 on the end of the shaft 5 so that the motion of the drive shaft will be transmitted to the conveyer-actuating shaft 5, the chain 28 and cooperating elements being arranged at either side of the machine as may be preferred. At the rear of the frame is a platform 30 upon which is mounted a small motor 31, preferably of the internal combustion type, and upon crank shaft of this motor is secured a sprocket 32, a chain 33 being trained about said sprocket and a sprocket 34 on the drive shaft 23. Extending longitudinally of the frame at one side thereof and at the inner side of the chain 33 and the sprockets about which it is trained is a blower casing 35, the forward portion of which constitutes a housing disposed concentrically about the shaft 23 and having a rearwardly directed discharge spout 36. Within the housing 35 is a combined fan and cutter 37 consisting of a disk or flywheel and blades which are disposed radially of the flywheel. At the front side of the casing 35 is an opening 41 through which the beet tops are presented to the action of the knife blades and immediately adjacent said opening is a gate or presser plate 42 which is hingedly mounted and is normally pressed inwardly by an expansion spring 43 fitted to the outer side of the gate and to any fixed point on the frame. Upon the platform 22 adjacent the housing 35 is a plate 44 constituting a rest upon which the beet bodies may be held while the tops are exposed to the cutter.

At the inner side of the housing and extending rearwardly from the platform 22 is a conveyer 45 which has its front end mounted upon the shaft 26 and its rear end supported at the rear end of the frame. This conveyer may conveniently be in the form of an endless belt or apron 46 equipped with cross bars 47 and operating longitudinally in a trough 48.

It is thought the operation of the machine will be readily understood from the foregoing description taken in connection with the accompanying drawings. An operator assumes a position upon the platform 22 and, as the machine travels over the field, the beet bodies with the tops thereon will be brought by the conveyer 20 to within convenient reach of the operator. The operator grasps the beets singly and presses the tops thereof through the opening 41 into the paths of the knives so that the tops will be removed. The presser plate 42 holds the tops within the casing so that they will not be thrown outwardly by the action of the fan and cutter but will be held in the path of the cutters so that the tops will be severed, and the several blades will push the severed tops downwardly and rearwardly through the casing. The shaft 23 is operated by the motor 31 and the motion of the shaft is, of course, transmitted through the described gearing to the several working instrumentalities. The disk or flywheel will rotate at a high speed and will, consequently, act as a fan or blower so that a strong draft will be created through the housing 35 from the opening 41 toward the end of the discharge spout 36, the tops being thereby blown rearwardly to be delivered onto the ground or into a receptacle carried by the rear end of the frame. As the tops are severed, the beet bodies are dropped in the conveyer 45 and the belt 46, traveling rearwardly, will carry the bodies to the rear end of the frame where they may be deposited in a receptacle or on the ground.

It will be readily seen that I have provided a very compact machine which will be of light draft but will be strong, durable and efficient. The beets being held to the cutter by manual manipulation, the removal of excessive portions or insufficient portions will be avoided and the severed tops will be carried rearwardly and discharged without any attention on the part of the operator. No appreciable strain is caused the operator by the presentation of the beets to the cutter and waste which is incidental to automatic machines is avoided.

Having thus described the invention, I claim:

A beet topper comprising a frame, a transverse shaft mounted on the frame, means on the frame for rotating said shaft, forwardly and downwardly converging arms mounted on the frame in advance of said shaft and provided at their front ends with runners adapted to move upon the ground and raise beets thereon, shafts mounted in the upper ends of said arms and geared to the transverse shaft to be driven thereby, cooperating conveyer chains mounted on said arms and extending to points immediately adjacent the runners, the inner runs of the chains being parallel in their forward portions and arranged to engage the beets taken up by the runners and move the same rearwardly, a screen secured to and extending between the lower forward portions of the arms and over which the inner opposed runs of the chains travel, and a second conveyer receiving the beets from said chains, said second conveyer having its forward portion disposed between said arms immediately at the rear of the screen and extending rearwardly over and beyond the transverse shaft.

In testimony whereof I affix my signature.

WILLIAM C. GOOKIN. [L. S.]